(12) United States Patent
Xu et al.

(10) Patent No.: US 11,167,587 B2
(45) Date of Patent: Nov. 9, 2021

(54) WHEEL AND RIM WITH WEIGHT REDUCTION INNER FLANGE

(71) Applicant: CITIC Dicastal CO., LTD., Hebei (CN)

(72) Inventors: Zuo Xu, Qinhuangdao (CN); Zhen Li, Qinhuangdao (CN); Xu Wang, Qinhuangdao (CN); Kaiqing Wang, Qinhuangdao (CN); Yule Zhou, Qinhuangdao (CN); Chuan Cheng, Qinhuangdao (CN); Changhai Li, Qinhuangdao (CN); Tiefeng Hu, Qinhuangdao (CN); Hui Chi, Qinhuangdao (CN)

(73) Assignee: CITIC Dicastal CO., LTD., Qinhuangdao (CN)

( * ) Notice: Subject to any disclaimer, the term of this patent is extended or adjusted under 35 U.S.C. 154(b) by 308 days.

(21) Appl. No.: 16/203,838

(22) Filed: Nov. 29, 2018

(65) Prior Publication Data
US 2019/0299706 A1    Oct. 3, 2019

(30) Foreign Application Priority Data
Mar. 5, 2018    (CN) .......................... 201810178120.9

(51) Int. Cl.
*B60B 21/02*    (2006.01)
*B60B 3/00*     (2006.01)
*B60B 3/10*     (2006.01)

(52) U.S. Cl.
CPC ............ *B60B 21/023* (2013.01); *B60B 3/002* (2013.01); *B60B 3/10* (2013.01); *B60B 2360/104* (2013.01); *B60B 2900/111* (2013.01)

(58) Field of Classification Search
CPC ..... B60B 21/023; B60B 21/04; B60B 21/104; B60B 21/106; B60B 3/002; B60B 2900/111
See application file for complete search history.

(56) References Cited

U.S. PATENT DOCUMENTS

| | | | | |
|---|---|---|---|---|
| 5,292,182 A | * | 3/1994 | Kanazawa | ................ B60B 3/06 301/65 |
| 7,922,261 B2 | * | 4/2011 | Gartner | ................. B60B 21/028 301/95.107 |

(Continued)

FOREIGN PATENT DOCUMENTS

| | | | |
|---|---|---|---|
| DE | 10146972 A1 | 4/2003 | |
| DE | 202008005455 U1 | * 8/2009 | ............... B60B 3/02 |
| WO | 0139909 A1 | 6/2001 | |

OTHER PUBLICATIONS

European Search Report in the European application No. 19158969.6, dated Sep. 27, 2019, 7 pgs.

Primary Examiner — S. Joseph Morano
Assistant Examiner — Emily G Castonguay
(74) Attorney, Agent, or Firm — Cooper Legal Group, LLC (57) ABSTRACT

A wheel and a rim with a weight reduction inner flange are provided. The rim includes an inner flange, a middle portion and an outer flange which are all annular and connected end to end to form an annular rim, in which the inner flange or the outer flange includes multiple groups of edge weight reduction sockets arranged side by side on one side of the inner cavity of a hub, and multiple groups of inner weight reduction sockets arranged side by side are provided inside the edge weight reduction sockets on the rim; a group of edge weight reduction sockets includes a first edge weight reduction socket and a second edge weight reduction socket at the edge of the inner flange or the outer flange, and the first (Continued)

edge weight reduction socket is in the shape of a right-angled triangle having round angles.

16 Claims, 5 Drawing Sheets

(56) References Cited

U.S. PATENT DOCUMENTS

| | | | |
|---|---|---|---|
| 2015/0210109 A1* | 7/2015 | Von Tardy-Tuch | B60B 1/06 |
| | | | 301/63.101 |
| 2017/0361647 A1* | 12/2017 | Herrmann | B60B 7/066 |
| 2019/0277358 A1* | 9/2019 | Zelenak | F16D 65/128 |

* cited by examiner

WHEEL AND RIM WITH WEIGHT REDUCTION INNER FLANGE

CROSS-REFERENCE TO RELATED APPLICATION

The present application claims benefit of Chinese Patent Application No. 201810178120.9, filed on Mar. 5, 2018, the contents of which are hereby incorporated by reference in its entirety.

BACKGROUND

With the increasing shortage of natural resources, the direction of development of modern automobile industry technology is to further reduce the weight of automobiles, reduce the consumption of fuels and reduce the emission of exhaust.

Aluminum alloy rims have won the favor of more and more private car owners by attractive appearance, safety, comfort and other characteristics. The lightweight design of the inner flange of the aluminum alloy rim is to optimize the design of the inner flange structure under the predetermined use environment and load condition, thereby reducing the weight of the rim and meeting the reliability and basic performance of the rim.

Thus, it has been desirable in the art to balance the weight reduction and the mechanical strength by reducing the weight of the rim as much as possible on the premise that the strength of the aluminum alloy rim is ensured by a specific inner flange weight reduction design.

SUMMARY

The present disclosure relates to the technical field of automobile parts, and specifically, relates to a weight reduction solution for an aluminum alloy rim with an inner flange having triangular weight reduction sockets.

The object of the present disclosure is to provide a weight reduction solution for a rim with an inner flange having weight reduction sockets.

Unless otherwise stated, in the present disclosure, "wheel" is intended to express a wheel disc and a rim made of an aluminum alloy. The wheel disc and the rim may be combined by bolts, welding, snapping or other method, or integrally formed.

In one aspect of the present disclosure, provided is a rim with a weight reduction inner flange, the rim being made of an aluminum alloy and comprising an inner flange, a middle portion and an outer flange which are all annular and connected end to end to form an annular rim, in which the inner flange or the outer flange includes multiple groups of edge weight reduction sockets arranged side by side on one side of the inner cavity of a rim, and multiple groups of inner weight reduction sockets arranged side by side are provided inside the edge weight reduction sockets on the rim; a group of edge weight reduction sockets includes a first edge weight reduction socket and a second edge weight reduction socket at the edge of the inner flange or the outer flange, and the first edge weight reduction socket is in the shape of a right-angled triangle having round angles; the second edge weight reduction socket is in the shape of a right-angled triangle having round angles; the right angle of the first edge weight reduction socket is close to the edge of the inner flange or the outer flange, and the right-angle side is parallel to the edge of the inner flange or the outer flange; one right-angle side of the second edge weight reduction socket is parallel to the inner flange or the outer flange; the hypotenuse of the first edge weight reduction socket is opposite to that of the second edge weight reduction socket, and the hypotenuses surround to form an intra-group reinforcing rib; between two groups of edge weight reduction sockets, the first edge weight reduction sockets are back to back and surround to form an inter-group reinforcing rib; and the inner weight reduction sockets are in the shape of rounded trapezoids.

In a preferred aspect of the disclosure, the rim with a weight reduction inner flange is a rim suitable for wheels of 14-22 inches.

In a preferred aspect of the disclosure, the length of the right-angle side of the first edge weight reduction socket is 8-15 mm.

In a preferred aspect of the disclosure, the distance between the right-angle sides of the first edge weight reduction sockets of two groups of edge weight reduction sockets is 8-15 mm.

In a preferred aspect of the disclosure, the length of the right-angle side of the second edge weight reduction socket is 8-15 mm.

In a preferred aspect of the disclosure, the inner weight reduction sockets have a length of 2-50 mm and a depth of 0.5-0.7 mm along the direction vertical to a wheel disc.

In a preferred aspect of the disclosure, the inner weight reduction sockets have a draft angle of 7-15°.

In a preferred aspect of the disclosure, the edge weight reduction sockets have a depth of 0.5-7 mm.

In a preferred aspect of the disclosure, the rim is made of A356.2 aluminum alloy.

In another aspect of the present disclosure, further provided is a wheel including the rim described above.

Figure 1:
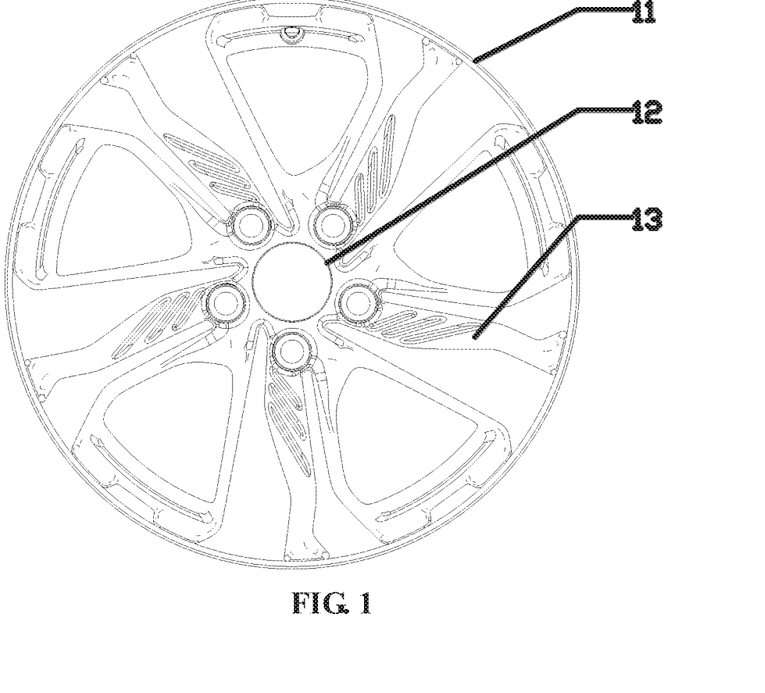
FIG. 1 is a schematic diagram of a front structure of a wheel disc and a rim according to first embodiment of the present disclosure.
Figure 2:
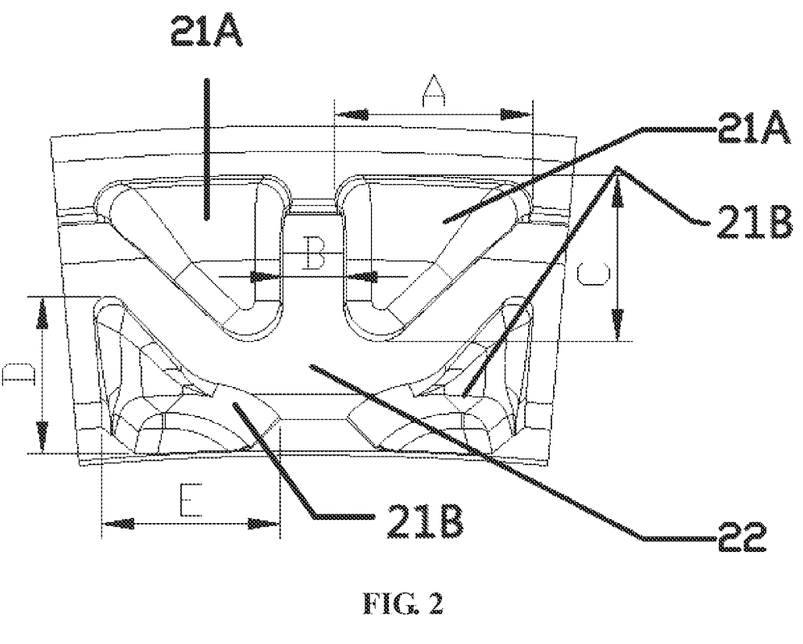
FIG. 2 is a top view of an inner flange weight reduction socket unit of the rim according to first embodiment of the present disclosure.

In other aspects of the present disclosure, further provided is the following technical solution: the inner flange weight reduction design of the rim includes weight reduction sockets, the single rim weight reduction socket is triangular, as shown in FIG. 2, the side lengths A, C, D, E of the triangles are 8-15 mm, the size F is 2-50 mm, the weight reduction sockets have depths of 0.5 to 7 mm and internal fillets R2-R5, the draft angle α is designed in the vertical face of the depth direction and is 7-15°, a structural unit including similar M-shaped reinforcing ribs is formed by arrangement, and the width of the reinforcing ribs in the structural unit is 4-10 mm; and the structural units are circumferentially arranged and uniformly distributed at the inner flange.

The weight of the rim is reduced by designing the weight reduction sockets in a specific shape for the inner flange of the rim and selecting the size of the weight reduction sockets. In addition, the rim after weight reduction still has excellent mechanical properties, meets American Wheel Standards of SAE J175 and SAE J328-2005, namely meet the performance requirements for 13-degree impact strength, 90-degree impact strength, radial impact, radial fatigue and bending fatigue, and can also meet the requirements of GB/T 5334-2005 and GB/T 15704-1995 for wheel strengths and fatigues.

BRIEF DESCRIPTION OF DRAWINGS

The embodiments of the present disclosure will be described in detail below in combination with the accompanying drawings, in which.

LIST OF REFERENCE SYMBOLS

11—rim, 12—flange plate, 13—spoke, 21—triangular inner flange weight reduction socket, 21A—first edge weight reduction socket, 21B—second edge weight reduction socket, 21C—inner weight reduction socket, 22—reinforcing rib.

DETAILED DESCRIPTION

First Embodiment

Figure 3:
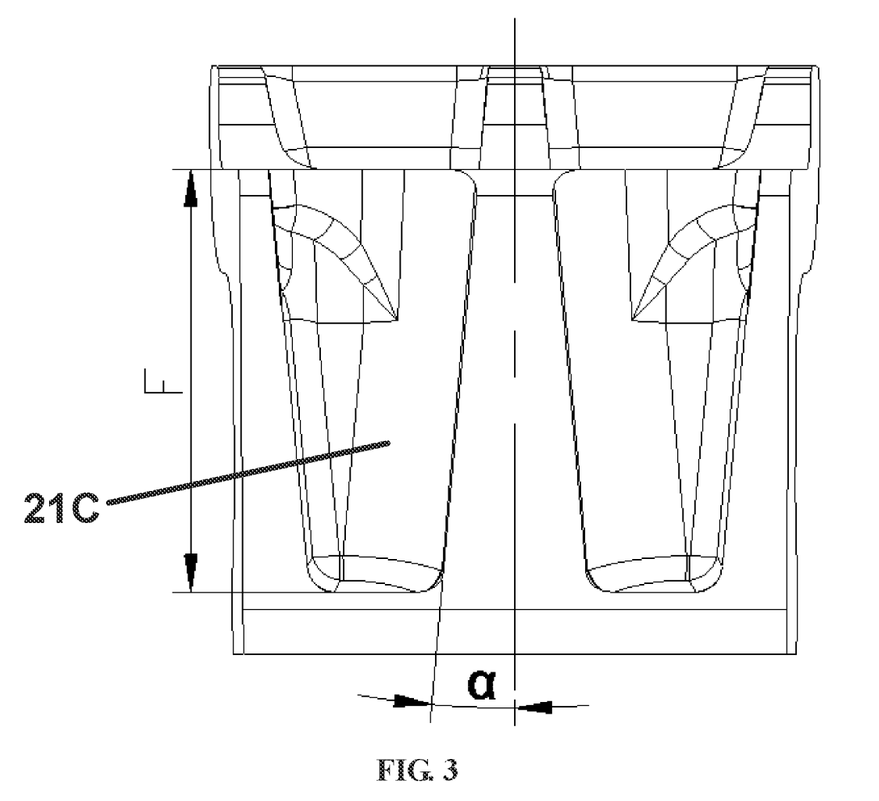
FIG. 3 is a front view of the inner flange weight reduction socket unit of the rim according to first embodiment of the present disclosure.
Figure 4:
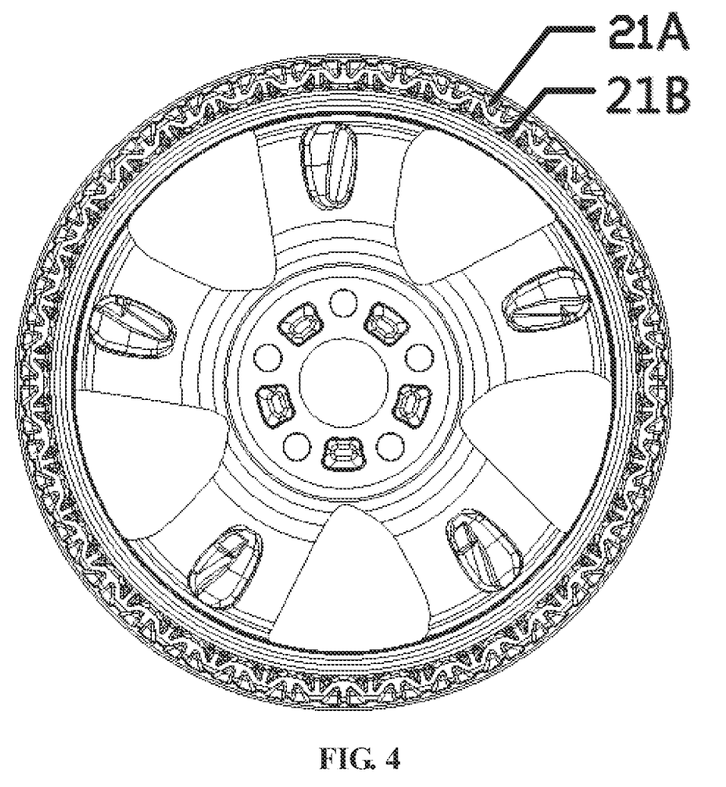
FIG. 4 is a schematic diagram of an inner flange weight reduction socket array of the rim according to first embodiment of the present disclosure.
Figure 5:
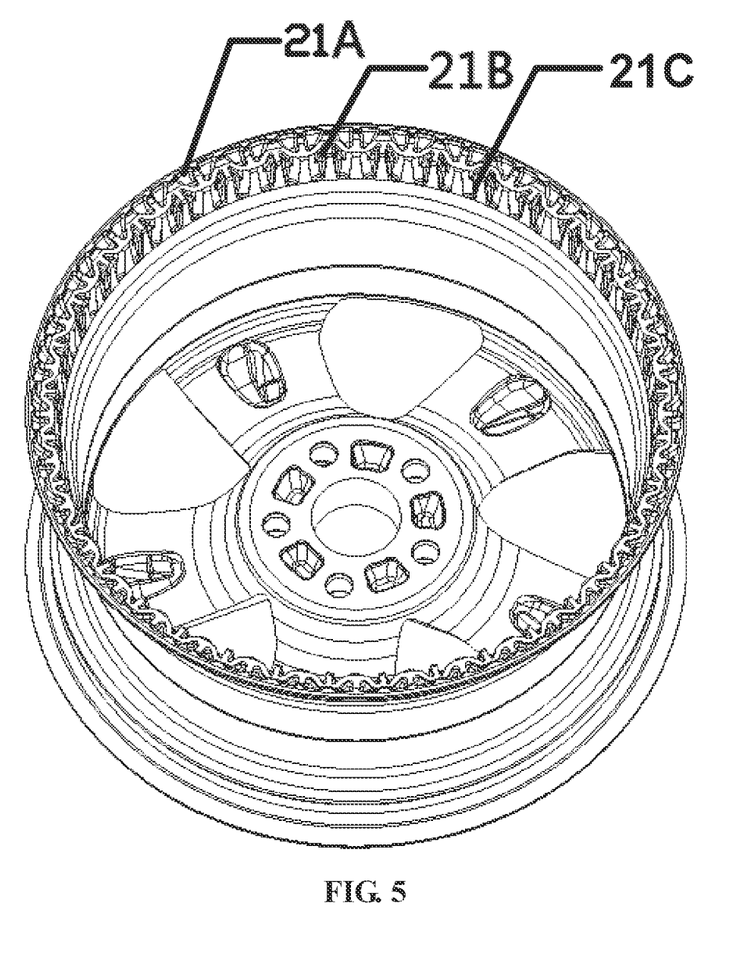
FIG. 5 is a three-dimensional structure diagram of the wheel disc and the rim according to first embodiment of the present disclosure.

Provided in this embodiment is a motor vehicle aluminum alloy rim 11 with an inner flange having weight reduction sockets and a wheel disc, and the wheel disc includes a flange plate 12, a flange plate periphery portion and spokes 13. The edge of the inner flange of the rim includes weight reduction sockets, and the inner flange weight reduction socket units are as shown in FIGS. 2 and 3, and form a structure of similar M reinforcing ribs.

In this embodiment, each length data is expressed as follows:

The length of the right-angle side of the first edge weight reduction socket 21A parallel to the flange: A The distance between the right-angle sides of the first edge weight reduction sockets 21A of two groups of edge weight reduction sockets: B The length of the right-angle side of the first edge weight reduction socket 21A vertical to the flange: C The length of the right-angle side of the second edge weight reduction socket 21B vertical to the flange: D The length of the right-angle side of the second edge weight reduction socket 21B parallel to the flange: E The length of the inner weight reduction socket 21C along the direction vertical to the wheel disc: F For the side lengths of the weight reduction socket units, A is 15 mm, C is 13 mm, D is 12 mm, E is 14 mm, and F is 28 mm, and the weight reduction sockets have a depth of 4 mm, back fillets R2, a rib width B of 5 mm, and a draft angle α of 7°. By test, the weight of the wheel is 11.29 kg in the absence of weight reduction sockets and is reduced by 0.3 kg in the presence of weight reduction sockets, and the weight reduction effect is about 2.7%.

Second Embodiment

This embodiment differs from first embodiment in that: for the side lengths of the weight reduction socket units, A is 8 mm, C is 8 mm, D is 8 mm, E is 8 mm, and F is 18 mm, and the weight reduction sockets have a depth of 5 mm, back fillets R2, a rib width B of 5 mm, and a draft angle α of 15°. By test, the weight of the wheel is 11.29 kg in the absence of weight reduction sockets and is reduced by 0.43 kg in the presence of weight reduction sockets, and the weight reduction effect is about 3.8%.

First Comparative Example

This comparative Example differs from first embodiment in that the rim is uniformly thinned until the weight of the entire wheel is reduced by 0.3 kg. For uniform thinning, the rim is thinned by 0.28 mm.

Second Comparative Example

This comparative Example differs from second embodiment in that the rim is uniformly thinned until the weight of the entire wheel is reduced by 0.43 kg. For uniform thinning, the rim is thinned by 0.30 mm.

Third Comparative Example

This comparative Example differs from first embodiment in that only the edge weight reduction sockets are retained, while the inner weight reduction sockets are removed. Correspondingly, the depth of the edge weight reduction sockets is changed from 4 mm to 6 mm By test, the weight of the wheel is 11.29 kg in the absence of weight reduction sockets and is reduced by 0.18 kg in the presence of weight reduction sockets, and the weight reduction effect is about 2.7%.

Third Embodiment

Various properties of the motor vehicle rims according to first and second embodiments, as well as first and second comparative Examples were tested. The strengths and fatigues, including 13-degree impact strength, 90-degree impact strength, radial impact, radial fatigue, bending fatigue and the like, of the above wheel were tested in the test center of Dicastal. The test passability is shown in Table 1.

American Wheel Standards of SAE J175 and SAE J328-2005 provide the requirements for 13-degree impact strength, radial fatigue and bending fatigue of the present disclosure. GB/T 5334-2005 and GB/T 15704-1995 respectively provide the test standards for wheel strength and fatigue performance requirements.

TABLE 1

Wheel performance tests of first and second embodiments and first and second comparative Examples

| | first embodiment | second embodiment | first comparative Example | second comparative Example | third comparative Example |
|---|---|---|---|---|---|
| 13-degree impact test | Y | Y | Y | Y | Y |
| 90-degree impact test | Y | Y | N | N | N |
| Radial impact test | Y | Y | N | N | N |
| Radial fatigue | Y | Y | Y | N | N |
| Bending fatigue | Y | Y | Y | Y | Y |

Note:
in the table, Y indicates passing the test, and N indicates failing in the test.

It can be seen from Table 1 that the wheels can pass all tests by adopting first and second embodiments under the same weight reduction pressure when the weight reduction socket design is adopted at the flange. However, various tests failed by uniformly thinning the rim. This shows that the weight reduction design on the rim requires special customization.

It can be seen from third comparative Example that various tests also fail under the same weight reduction pressure when only the edge weight reduction sockets are retained. Hence, when the edge weight reduction sockets and the inner weight reduction sockets are simultaneously designed, a better weight reduction effect is achieved, and the basic strength of the wheel is not affected.

Therefore, the rims of first and second embodiments met American Wheel Standards of SAE J175 and SAE J328-2005, namely met the performance requirements for 13-degree impact strength, radial fatigue and bending fatigue, and can also meet the requirements of GB/T 5334-2005 and GB/T 15704-1995 for wheel strengths and fatigues. However, first and second comparative Examples did not fully meet the above requirements.

The invention claimed is:

1. A rim with a weight reduction inner flange, the rim being made of an aluminum alloy and comprising an inner flange, a middle portion and an outer flange which are all annular and connected end to end to form an annular rim, wherein the inner flange or the outer flange comprises multiple groups of edge weight reduction sockets arranged side by side on one side of an inner cavity of the rim, and multiple groups of inner weight reduction sockets arranged side by side are provided inside the edge weight reduction sockets on the rim; a group of the edge weight reduction sockets comprises a first edge weight reduction socket and a second edge weight reduction socket at an edge of the inner flange or the outer flange, and the first edge weight reduction socket is in a shape of a right-angled triangle having rounded angles; the second edge weight reduction socket is in a shape of a right-angled triangle having rounded angles; a right angle of the first edge weight reduction socket is adjacent to the edge of the inner flange or the outer flange, and a right-angle side of the first edge weight reduction socket is parallel to the edge of the inner flange or the outer flange; a right-angle side of the second edge weight reduction socket is parallel to the inner flange or the outer flange; a hypotenuse of the first edge weight reduction socket faces towards a hypotenuse of the second edge weight reduction socket, and an intra-group reinforcing rib is formed between the hypotenuse of the first weight reduction socket and the hypotenuse of the second edge weight reduction socket; in two groups of the edge weight reduction sockets, two first edge weight reduction sockets are back to back and form an inter-group reinforcing rib between a first of the two first edge weight reduction sockets and a second of the two first edge weight reduction sockets; and the inner weight reduction sockets are in a shape of rounded trapezoids.

2. The rim with the weight reduction inner flange according to claim 1, wherein the rim with the weight reduction inner flange is a rim for wheels of 14-22 inches.

3. The rim with the weight reduction inner flange according to claim 1, wherein a length of each right-angle side of the first edge weight reduction socket is 8-15 mm.

4. The rim with the weight reduction inner flange according to claim 1, wherein a distance between the right-angle sides of the first edge weight reduction sockets of the two groups of the edge weight reduction sockets is 8-15 mm.

5. The rim with the weight reduction inner flange according to claim 1, wherein a length of each right-angle side of the second edge weight reduction socket is 8-15 mm.

6. The rim with the weight reduction inner flange according to claim 1, wherein the inner weight reduction sockets have a length of 2-50 mm and a depth of 0.5-0.7 mm along a direction vertical to a wheel disc.

7. The rim with the weight reduction inner flange according to claim 1, wherein the inner weight reduction sockets have a draft angle of 7-15°.

8. The rim with the weight reduction inner flange according to claim 1, wherein the edge weight reduction sockets have a depth of 0.5-7 mm.

9. A wheel, comprising a rim with a weight reduction inner flange, the rim being made of an aluminum alloy and comprising an inner flange, a middle portion and an outer flange which are all annular and connected end to end to form an annular rim, wherein the inner flange or the outer flange comprises multiple groups of edge weight reduction sockets arranged side by side on one side of an inner cavity of the rim, and multiple groups of inner weight reduction sockets arranged side by side are provided inside the edge weight reduction sockets on the rim; a group of the edge weight reduction sockets comprises a first edge weight reduction socket and a second edge weight reduction socket at an edge of the inner flange or the outer flange, and the first edge weight reduction socket is in a shape of a right-angled triangle having rounded angles; the second edge weight reduction socket is in a shape of a right-angled triangle having rounded angles; a right angle of the first edge weight reduction socket is adjacent to the edge of the inner flange or the outer flange, and a right-angle side of the first edge weight reduction socket is parallel to the edge of the inner flange or the outer flange; a right-angle side of the second edge weight reduction socket is parallel to the inner flange or the outer flange; a hypotenuse of the first edge weight reduction socket faces towards a hypotenuse of the second edge weight reduction socket, and an intra-group reinforcing rib is formed between the hypotenuse of the first weight reduction socket and the hypotenuse of the second edge weight reduction socket; in two groups of the edge weight reduction sockets, two first edge weight reduction sockets are back to back and form an inter-group reinforcing rib between a first of the two first edge weight reduction sockets and a second of the two first edge weight reduction sockets; and the inner weight reduction sockets are in a shape of rounded trapezoids.

10. The wheel according to claim 9, wherein the rim with the weight reduction inner flange is a rim for wheels of 14-22 inches.

11. The wheel according to claim 9, wherein a length of each right-angle side of the first edge weight reduction socket is 8-15 mm.

12. The wheel according to claim 9, wherein a distance between the right-angle sides of the first edge weight reduction sockets of the two groups of the edge weight reduction sockets is 8-15 mm.

13. The wheel according to claim 9, wherein a length of each right-angle side of the second edge weight reduction socket is 8-15 mm.

14. The wheel according to claim 9, wherein the inner weight reduction sockets have a length of 2-50 mm and a depth of 0.5-0.7 mm along a direction vertical to a wheel disc.

15. The wheel according to claim 9, wherein the inner weight reduction sockets have a draft angle of 7-15°.

16. The wheel according to claim 9, wherein the edge weight reduction sockets have a depth of 0.5-7 mm.

* * * * *